July 19, 1955

J. M. WUERTH ET AL 2,713,637

ANTENNA REFLECTOR AND DRIVE

Filed Jan. 9, 1950

INVENTORS
JOHN M. WUERTH
ROBERT E. SMITH
WILLIAM D. MULLINS, JR.
SYDNEY J. GOLDBERG
CHARLES T. WILSON, JR

BY William R. Lane

ATTORNEY

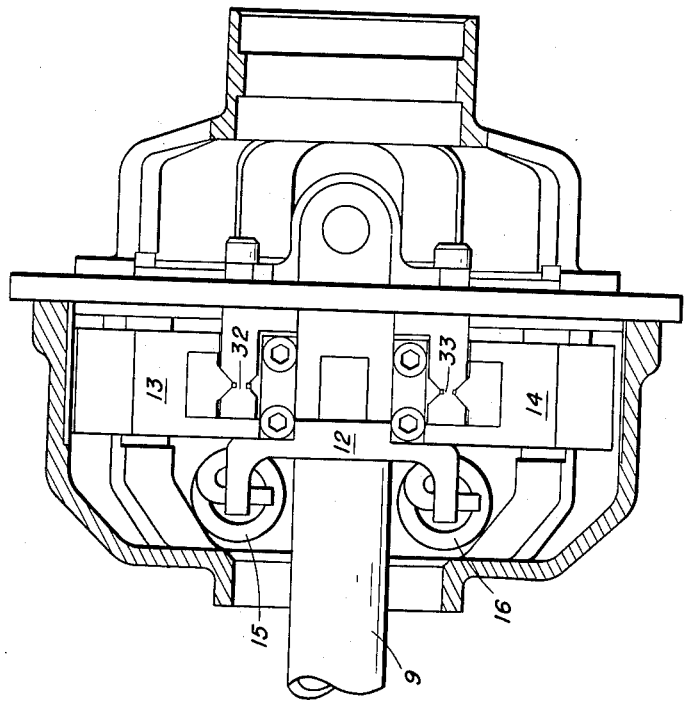

INVENTOR.
JOHN M. WUERTH
ROBERT E. SMITH
WILLIAM D. MULLINS, JR.
SYDNEY J. GOLDBERG
CHARLES T. WILSON, JR.
BY
William R. Lane
ATTORNEY United States Patent Office 2,713,637
Patented July 19, 1955

2,713,637

ANTENNA REFLECTOR AND DRIVE

John M. Wuerth, Whittier, William D. Mullins, Jr., and Robert E. Smith, Downey, and Sydney J. Goldberg and Charles T. Wilson, Jr., Los Angeles, Calif., assignors to North American Aviation, Inc.

Application January 9, 1950, Serial No. 137,634

13 Claims. (Cl. 250—33.65)

This invention pertains to radar antennae, and particularly to a radar antenna capable of conical scan. In order to track a rapidly moving target by means of radar it is necessary that radiant energy originating at the radar set be directed not only to the target in its present position but throughout a small cone covering the target and the immediately surrounding area. This allows for sharp and sudden changes in the motion of the target while still retaining it in the field of "vision" of the radar. Because the relative motion between the target and the target-seeking device on which the radar is mounted may be very large, it is necessary that the radar scan the small cone, which includes the target, with extreme rapidity in order to maintain a constant, accurate record of target position. In the past it has been considered to use some sort of oscillating drive for the radar antenna which would force the principal axis of the reflector to describe the aforementioned conical pattern, thus expending and receiving radiant energy from this limited area. However, as the speed of scan is increased, vibration problems arise unless special consideration is given to the mass of the radar dish and its rigidly associated equipment. Furthermore, it is desirable that the cone of scan of the radar antenna reflector be adjustable in amount in order to take care of variations in range of the target during both tracking and searching. It is desirable when the target to be tracked is a considerable distance from the radar that the angle of scan be extremely small. Whereas, if the target is close at hand, it is desirable that the conical angle of scan be somewhat larger. Reduced angle is again required for accuracy at very close range when closing the target rapidly. Also, provision must be made for proper coverage of the search area when the device is employed for searching. The problem, then, is to devise a simple radar scanning mechanism which is capable of an extremely rapid traverse of the scanned area without undue vibration, and which may be adjusted to give different solid conical angles of scan.

In order that the radar antenna reflector may traverse the cone of scan with the utmost speed it is necessary to impart to the reflector an oscillatory motion such that every point on the principal axis of the reflector describes a circle whose plane is normal to a line joining the center of the circle and the center of the reflector. If forces and moments were applied to the radar antenna reflector at random points, even though the reflector were properly re-enforced and restrained, there would result a large dissipation of mechanical energy due to forced vibrations of the reflector. However, if it were possible to apply the energy required to oscillate the reflector at a point or points on the reflector which would produce no vibrations, a considerable energy-saving could be effected.

This invention contemplates oscillation of the radar reflector by application of forces at the center of percussion of the radar reflector and assembly. The center of percussion is defined as that point in a rotating rigid body through which the resultant of the effective forces of the body acts. In other words, the center of percussion is that point at which a force may be applied without causing translation of the center of rotation of the body and at which only rotation of the body is produced by the application of the force. A simple example of the center of percussion is the point at which a baseball batter must bring his bat in contact with the ball in order to avoid stinging his hands. If the bat is grasped near its end this point normally falls about three-fourths of the way out on the bat. If the batter hits the ball at this point he experiences no peculiar sensation in his hands. However, if the batter hits the ball at the extreme end of the bat, or near its mid-section, he experiences a severe stinging sensation, indicating that a reaction has been transmitted through the center of rotation of the bat.

In oscillating a radar antenna reflector, a similar problem is encountered. If the forces which must be applied to the reflector to impart to it the oscillatory motion necessary to scan the target are applied at any point other than the center of percussion, severe reactions must be provided for at the center of rotation of the oscillated mechanism. These reactions make necessary heavy bearings and produce undesirable vibrations which tend to destroy the oscillating structure. But, if the reflector and associated equipment is so arranged that the oscillating forces can be applied at the center of percussion of the entire rigid mass, the result is a smooth scanning movement; and the center of rotation of the reflector need be equipped only with light bearings, since no substantial reactions are present.

It is an object of this invention to provide a mechanism for causing a radar antenna reflector to describe a conical scan.

It is a further object of this invention to provide a radar scanning mechanism which drives the radar antenna reflector at its center of percussion.

It is another object of this invention to provide a radar antenna reflector drive which has an adjustable conical scan.

It is another object of this invention to provide a radar scanning mechanism in which a minimum of power needs to be applied to the oscillated scanning device.

It is another object of this invention to provide a radar scanning device capable of very high-speed scan.

It is another object of this invention to provide a radar scanning device which is virtually free of vibration.

It is another object of this invention to provide a radar scanning device which is of minimum weight.

It is another object of this invention to provide a radar scanning device having a balanced oscillatory movement.

It is another object of this invention to provide a radar reflector drive having a self-balancing, adjustable scanning amplitude.

It is a further object of this invention to provide a radar scanning movement which is smoothly adjustable and accurately controllable in amplitude.

Other objects of the invention will become apparent from the following description taken in connection with the accompanying drawings, in which Fig. 1 is a sectional view of the scanning mechanism;

Fig. 2 is a cut-away plan view of the device shown in Fig. 1;

Fig. 3 is an end view of the device shown in Fig. 1;

Figure 1:
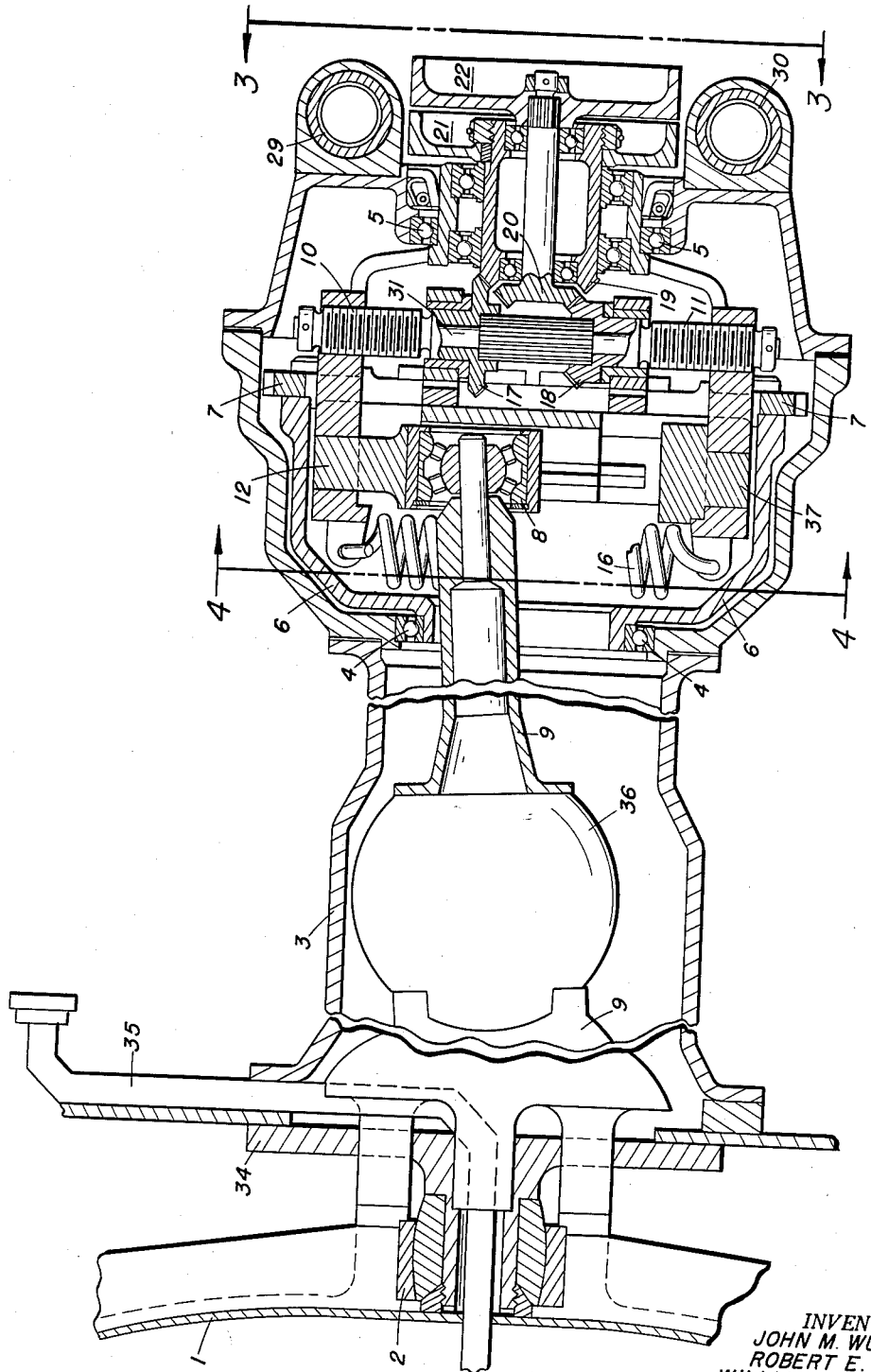
Figure 5:
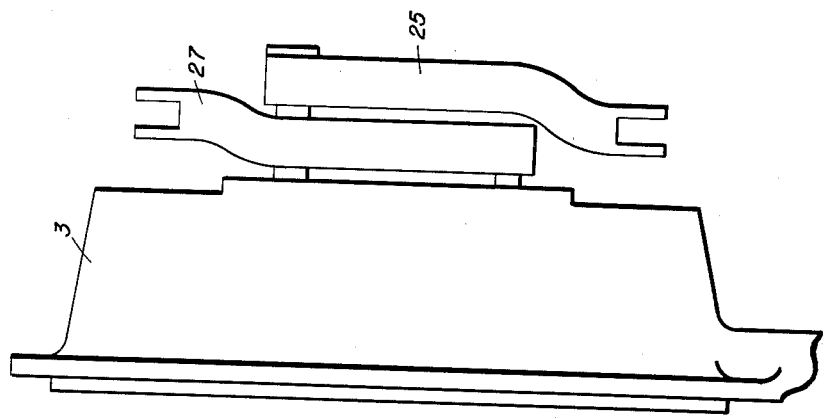

And Fig. 5 is a partial elevational view of the device shown in Fig. 1.

Figure 4:
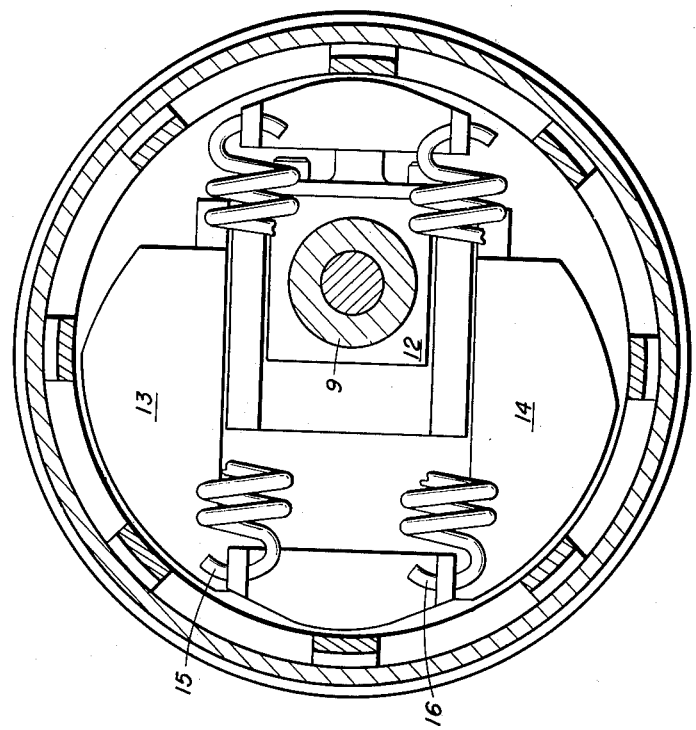
Fig. 4 is a sectional view of the device shown in Fig. 1, taken at 4—4 in Fig. 1, and rotated 90° clockwise.

Referring to the drawings, and particularly to Fig. 1, radar reflector 1 is shown supported by spherical bearing 2 rigidly attached to and supported in a gimbaled housing 34, in turn, supported in the nose of an aircraft. The center of spherical bearing 2 forms the center of rotation of the radar antenna and all masses rigidly attached thereto. A wave guide 35 attached to the gimbaled housing structure furnishes radiant energy to the focal point of reflector 1. Rigidly attached to bearing 2 is tubular beam 9 having at its center a counterweight 36. Counterweight 36 may be located at other points on beam 9, but for minimum size and maximum effectiveness it is mounted midway between spherical bearing 2 and the opposite end of beam 9. Surrounding tubular beam 9 is a frame 3 rigidly attached to the gimbaled housing or other device intended to employ this scanning movement. Frame 3 is equipped with end bearings 4 and 5 which support rotating housing 6. Housing 6 is rigidly attached to flywheel gear 7 which is driven at high speed by an electric motor (not shown). Gear 7 carries a self-aligning universal-type bearing 8 which is adjustable in position radially from the axis of rotation of gear 7. This bearing rotates with the gear and carries with it the end of tube 9 which is attached rigidly to the reflector, with the result, therefore, that if universal bearing 8 is displaced from the center of rotation of gear 7 it causes the principal axis of the reflector to describe an oscillatory motion without rotation of the reflector about its axis—a motion which is denoted herein as a nutation. The amount by which the center of universal bearing 8 is displaced from the center of rotation of gear 7 is controlled by rotation of screw members 10 and 11 acting on bearing mount 12 and counterbalances 13 and 14 provided for the purpose of dynamically balancing the end reaction of tube 9 for all possible adjustments of the position of universal bearing 8. Bearing 8 and counterbalances 13 and 14 are positioned and guided in carriages or ways 32 and 33 supported on gear 7. The counterbalances, of course, are chosen to be equivalent in mass to universal bearing 8 and the effective mass of its associated rigidly attached parts to maintain dynamic balance. The combined mass and center of gravity location of counterbalances 13 and 14 are chosen such that their net centrifugal force is equal and opposite to the end reaction of tube 9; and springs 15 and 16, more particularly shown at Fig. 4, are provided to relieve the centrifugal force reactions of counterbalances 13 and 14, universal bearing 8 and associated parts from screws 10 and 11. This reduces the torque required of the braking assembly to be described hereinafter. Since gear 7 and the whole assembly attached thereto must be rotated at very high speed in order to attain the required rapid conical scan, there exists the problem of adjusting the amplitude of scan remotely. This problem is met by use of pinion gears 17 and 18 which turn screw members 10 and 11 respectively in response to pinion gears 19 and 20 respectively, whose motions are controlled by friction on brake drums 21 and 22 respectively, caused by brake shoes 23 and 24 shown in Fig. 3. Brake shoes 23 and 24 are actuated by brake levers 25 and 26 which control speed of rotation of drum 22, while similar brake shoes (not shown) are actuated by brake levers 27 and 28 and control the rotation of brake drum 21. Brake levers 25, 26, 27 and 28 are actuated by solenoid actuators 29 and 30, shown in Fig. 3, and partially in section in Fig. 1.

Adjustment of the amplitude of conical scan of the radar reflector is accomplished by braking brake drums 21 and 22 selectively. If neither brake drum is braked, the brake drums and the entire assembly attached to gear 7 rotate at constant high velocity. However, if, for example, braking action is applied to drum 21, gear 19, to which it is attached, immediately exerts a restraining torque upon gear 17 attached to screw member 10. Screws 10 and 11 are keyed together by splined shaft 31, and are threaded left and right-hand respectively such that as they rotate together the bearing mount 12 and the counterbalance mount 37 move either in or out together from the axis of rotation at an equal rate. When control is such as to decrease the angle of conical scan, the energy for the application of this torque comes largely from the energy of rotation stored in the rapidly rotating apparatus, the entire assembly tending to speed up as the cone angle is decreased. Screw members 10 and 11, therefore, turn, adjusting the position of universal bearing 8 vertically downward in Fig. 1. Counterbalances 13 and 14 are adjusted correspondingly upward to keep the now reduced end reaction of tube 9 dynamically balanced. In a similar manner, application of a braking torque to drum 22 produces a similar adjustment in the positions of the universal bearing and the position of the counterbalances—but in the opposite sense, since gears 18 and 20 drive the screws 10 and 11 in the opposite direction of rotation.

Since the total mass being oscillated is relatively large, it can be seen that a relatively large amount of power is required to change the amplitude of oscillation. To furnish this power from an external source would obviously be difficult. However, by using the stored energy of rotation of the rotating gear and associated apparatus, reductions in the amplitude to oscillation, and hence in the conical angle of scan can be made with very little instantaneous expenditure of power and with only slight changes in the speed of gear 7. Moreover, increasing the angle of conical scan is aided by the fact that the unbalanced centrifugal force (net remaining above the restraint provided by springs 15 and 16) produces an aiding torque to the screws. Exact adjustment of the conical angle of scan can be readily attained because of the positive action of gears 17, 18, 19 and 20 and screw members 10 and 11, which may be made with any desired precision commensurate with the accuracy of adjustment required. Moreover, the adjustment can be accomplished smoothly because there is involved no sudden application of power to the oscillating mass. Because wave guide 35 is at all times held stationary with respect to the fixed gimbaled housing, the amplitude of oscillation of the radar reflector 1 is only half the resultant effective solid angle of scan.

The conical scan device serves two principal purposes: when the radar is employed for tracking a definite target the solid cone angle is maintained at an optimum fixed value for the target range and size by allowing brake drums 21 and 22 to rotate freely; when the radar is employed for searching, the gimbaled housing is moved angularly in a predetermined variable pattern and the solid conical angle of scan is also varied to produce a widely distributed interlacing pattern. By varying the cone angle and the motion of the gimbaled housing together, optimum coverage with proper interlace may be obtained for widely varying search conditions.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Means for controllably directing radiant energy comprising a reflector, a lever attached rigidly to said reflector and extending therefrom, a predetermined mass positioned upon said lever, means for pivoting said lever, said reflector, and said mass about a non-centroidal preselected point, and means for imparting a nutation to the center of percussion of said reflector, said lever, and said mass to thereby controllably direct radiant energy reflected by said reflector without creating reactions at said non-centroidal point.

2. Radar scanning means comprising a concave reflector, a bar attached rigidly to the center of the convex side of said reflector, pivot means for supporting said bar adjacent the reflector end thereof, a counterweight upon said bar, and means for applying a force at the center of percussion of said bar, said reflector, and said counterweight causing the free end of said bar to describe a circular motion whereby no reactions occur on said pivot means due to said circular motion.

3. A device as recited in claim 2 in which said means for applying said force at said center of percussion comprise a flywheel rotated at high speed, a universal joint on said flywheel but displaced from the axis of rotation thereof and pivotally engaged with said bar whereby when said flywheel is rotated a scanning motion is imparted to said reflector.

4. Means for controllably directing radiant energy comprising a reflector, a lever attached rigidly to said reflector and extending therefrom, a predetermined mass positioned upon said lever, means for pivoting said lever and said reflector about a non-centroidal preselected point, and means for imparting a variable nutation of controllable amplitude to the center of percussion of said reflector and said lever to thereby controllably direct radiant energy reflected by said reflector without creating reactions at said non-centroidal point.

5. A device as recited in claim 4 in which said means for imparting nutation comprises a flywheel, a universal joint attached thereto and drivingly attached to the center of percussion of said reflector and said lever, means for varying the radial coordinate of said universal joint on said flywheel, and means for rotating said flywheel at high speed to thereby controllably direct radiant energy.

6. Means for causing a beam of radiant energy to generate the surface of a cone of variable base diameter comprising a reflector, wave guide means for conducting radiant energy onto said reflector, a lever attached rigidly to said reflector and extending therefrom, means for pivoting said lever and said reflector about a non-centroidal point thereon, a flywheel rotatable about the axis of symmetry of said reflector and said lever, a universal joint rigidly attached thereto and pivotally associated with the center of percussion of said lever and reflector, means for varying the radial coordinate of said universal joint on said flywheel, and means for rotating said flywheel at high speed to thereby cause a beam of radiant energy to generate the surface of a cone of variable base diameter.

7. A device as recited in claim 6 in which said means for varying the radial coordinate of said universal joint on said flywheel comprises a radially slideable carriage attached to said joint, ways on said flywheel for sliding said carriage, screw means on said flywheel adapted to move said carriage radially on said flywheel, a pinion gear attached to and adapted to turn said screw means, a second pinion gear engaging said first-named pinion gear and centered on the center of rotation of said flywheel, and braking means operatively associated with said second-named pinion gear for causing said first-named pinion gear to turn about said second-named pinion gear when said flywheel is rotated to thereby adjust the radial position of said universal joint and vary the conical angle of scan of said beam of radiant energy.

8. Means for oscillating a radar reflector at high speed comprising a rigid beam attached to the non-reflecting side of said reflector and extending therefrom, a counterweight positioned on said beam, a pivot attached to said beam for restraining a point on said beam against translation while allowing angular movement of said beam around said point, and means operating at the center of percussion of the combination of said beam, said reflector, and said counterweight, for rotating said beam about the principal axis of said reflector whereby dynamic reactions on said restrained point due to said rotation are eliminated.

9. A device as recited in claim 8 in which said means for rotating comprises a flywheel rotatable about said principal axis, a universal joint on said flywheel removed from the center of rotation of said flywheel, means for rotating said flywheel at high angular velocity, and pivot means on said beam connected to said joint whereby when said flywheel is rotated at high angular velocity said radar reflector oscillates without imparting reactions to said beam-restraining pivot.

10. Radiant energy scanning means comprising a concave radiant energy reflector, wave guide means for supplying radiant energy to the focal point of said reflector in a direction such as to cast said energy onto said reflector, a rigid beam attached to the non-concave side of said reflector and extending therefrom along the principal axis of said reflector, a pivot for supporting said reflector against translation located near the attachment of said beam thereto, a counterweight of predetermined mass on said beam, a second pivot on the center of percussion of said beam, and means for causing said second pivot to rotate about said principal axis to thereby cause conical scanning motion of said radiant energy.

11. A device as recited in claim 10 in which said means for causing said second pivot to rotate about said principal axis without spinning comprises a flywheel whose axis of rotation includes the focal point of said reflector, a universal joint on said flywheel fitted to said second pivot, balanced means for adjusting remotely the radial coordinate of said universal joint on said flywheel, and means for rotating said flywheel at high angular velocity to thereby produce a conical scan of said radiant energy.

12. Variable amplitude radiant energy conical scanning means comprising a concave radiant energy reflector, wave guide means for furnishing radiant energy to said reflector, a rigid beam attached to the convex side of said reflector and extending therefrom along the principal axis of said reflector, a pivot for supporting said reflector against translation located near the attachment of said beam thereto, a counterweight of predetermined mass located approximately midway on said beam, a second pivot on the free end of said beam, a flywheel rotatable about a line through said first pivot point and the end of said wave guide, a universal joint on said flywheel fitted to said second pivot, a carriage slideable radially on said flywheel, counterbalances on said flywheel slideable in coordination with said carriage for maintaining said flywheel in balance when said carriage is moved radially, screw means interconnected between said counterbalances and said carriage for increasing or decreasing their radial coordinates on said flywheel together, and remotely operable gear means for actuating said screw means thereby to vary the amplitude of conical scan of said radiant energy.

13. A device as recited in claim 12 in which said remotely operable means comprises two pinion gears drivingly attached to said screw means, two coaxial pinion gears rotatable about the axis of rotation of said flywheel and each engaging one of said first two pinion gears, a brake drum rigidly attached to each of said last-named pinion gears, and brake shoes for braking said brake drums selectively to thereby adjust the amplitude of said variable amplitude radiant energy conical scan.

References Cited in the file of this patent

UNITED STATES PATENTS

| | | |
|---|---|---|
| 1,866,403 | Elmer | July 5, 1932 |
| 2,464,394 | Herzlinger | Mar. 15, 1949 |
| 2,487,591 | Ricci | Nov. 8, 1949 |
| 2,498,056 | Werner | Feb. 21, 1950 |
| 2,499,228 | Norden | Feb. 28, 1950 |